US009116865B2

(12) United States Patent
Le Chevalier et al.

(10) Patent No.: US 9,116,865 B2
(45) Date of Patent: Aug. 25, 2015

(54) ENHANCING AUTOMATED TERMS LISTINGS IN HTML DOCUMENT PUBLISHING BASED ON USER SEARCHES

(71) Applicant: Chegg, Inc., Santa Clara, CA (US)

(72) Inventors: Vincent Le Chevalier, San Jose, CA (US); Charles F. Geiger, San Jose, CA (US)

(73) Assignee: Chegg, Inc., Santa Clara, CA (US)

( * ) Notice: Subject to any disclaimer, the term of this patent is extended or adjusted under 35 U.S.C. 154(b) by 299 days.

(21) Appl. No.: 13/783,937

(22) Filed: Mar. 4, 2013

(65) Prior Publication Data

US 2014/0156255 A1    Jun. 5, 2014

Related U.S. Application Data

(60) Provisional application No. 61/733,728, filed on Dec. 5, 2012.

(51) Int. Cl.
| | |
|---|---|
| G06F 17/28 | (2006.01) |
| G06F 17/21 | (2006.01) |
| G06F 17/30 | (2006.01) |
| G06F 21/44 | (2013.01) |
| G06F 17/27 | (2006.01) |

(52) U.S. Cl.
CPC .......... *G06F 17/212* (2013.01); *G06F 17/2735* (2013.01); *G06F 17/289* (2013.01); *G06F 17/3089* (2013.01); *G06F 17/30563* (2013.01); *G06F 21/44* (2013.01)

(58) Field of Classification Search
None
See application file for complete search history.

(56) References Cited

U.S. PATENT DOCUMENTS

| | | | |
|---|---|---|---|
| 5,822,720 A | 10/1998 | Bookman et al. | |
| 5,827,070 A | 10/1998 | Kershaw et al. | |
| 6,523,001 B1 * | 2/2003 | Chase | 704/10 |
| 7,580,831 B2 * | 8/2009 | Haskell et al. | 704/10 |
| 7,945,527 B2 * | 5/2011 | Michelin | 706/62 |
| 8,380,493 B2 * | 2/2013 | Chronister et al. | 704/10 |
| 2002/0034720 A1 | 3/2002 | McManus et al. | |
| 2004/0221013 A1 | 11/2004 | Timbadia et al. | |
| 2008/0021886 A1 | 1/2008 | Wang-Aryattanwanich et al. | |
| 2008/0133591 A1 | 6/2008 | Bookman et al. | |
| 2008/0141182 A1 | 6/2008 | Barsness et al. | |
| 2008/0147646 A1 | 6/2008 | Jaschek et al. | |
| 2009/0144614 A1 * | 6/2009 | Dresevic et al. | 715/239 |
| 2011/0087956 A1 | 4/2011 | Sherman et al. | |
| 2011/0236873 A1 | 9/2011 | Bowers | |

(Continued)

OTHER PUBLICATIONS

PCT International Search Report and Written Opinion for PCT/US2013/072879, Mar. 28, 2014, 9 Pages.

(Continued)

*Primary Examiner* — Jeremiah Bryar
(74) *Attorney, Agent, or Firm* — Fenwick & West LLP

(57) ABSTRACT

A terms listing production system generates a terms listing associated with an electronic document. Primary terms and primary definitions may be extracted from a glossary associated with the electronic document. Secondary terms may be identified based on user searches in relation to the electronic document. Secondary definitions associated with primary terms or secondary terms may be retrieved from external content and stored in connection with the associated terms. A markup language document configured for presentation to users is generated based on the stored terms and definitions.

22 Claims, 12 Drawing Sheets

(56) References Cited

U.S. PATENT DOCUMENTS

2013/0088511 A1 4/2013 Mitra et al.
2013/0151539 A1 6/2013 Shi et al.

OTHER PUBLICATIONS

United States Office Action, U.S. Appl. No. 13/783,974, Mar. 13, 2015, 23 pages.

* cited by examiner

FIG. 8

ENHANCING AUTOMATED TERMS LISTINGS IN HTML DOCUMENT PUBLISHING BASED ON USER SEARCHES

CROSS REFERENCE TO RELATED APPLICATIONS

This application claims the benefit of U.S. Provisional Application No. 61/733,728, filed Dec. 5, 2012, which is incorporated by reference in its entirety.

BACKGROUND

1. Field of the Invention

This invention relates to production of terms listings associated with electronic documents.

2. Description of the Related Art

The rapid shift to mobile Internet services is bringing content offerings to an increasingly larger number of connected devices. Experiences previously limited to a single device are now accessible across multiple devices as high volume consumer electronic platforms such as Smart Phones, tablets, eReaders, game systems, and Internet TVs have become new channels to receive digital documents and services. Popular electronic book services leverage standardized publishing formats to seamlessly integrate and synchronize digital document reading experiences across consumer devices.

As digital documents are shifting from a static model to a connected one where related, personalized, and other social content are being aggregated dynamically within the original document, it becomes strategic for publishing platforms and their distribution systems to be able to properly author and manage these new individual content layers among a plurality of users. But while providing excellent user reading experience for this new digital medium remains a focus of the commercially available eReading systems and applications, it has been so far much more difficult to fully integrate other related reading activities. In addition, as new digital content services are progressively embedded within the original document, it becomes increasingly difficult to create, edit, and organize these additional content layers into a single reading experience.

SUMMARY

A terms listing production system generates a terms listing associated with an electronic document, such as an electronic textbook. In one embodiment, terms and their definitions are extracted from a glossary associated with the electronic document and stored in a terms database. The terms listing production system identifies the terms and definitions by identifying patterns specific to the glossary. In another embodiment, the terms listing production system receives a list of terms searched by users in relation to an electronic document. A definition of each searched term is retrieved from an electronic dictionary and stored in the terms database in connection with the associated term.

The terms listing production system generates a markup language terms listing document for presenting the terms and their definitions to users. The terms listing document may include a plurality of regions, in which each term or definition in the terms database is mapped to a unique region of the markup language document. The regions can be delivered independently to client devices for rendering and presentation to users. In one embodiment, the terms listing production system enhances the terms listing document by retrieving content external to the electronic document that is related to one or more of the terms. The terms listing document is configured for display to users in a number of different formats.

The features and advantages described in this summary and the following detailed description are not all-inclusive. Many additional features and advantages will be apparent to one of ordinary skill in the art in view of the drawings, specification, and claims.

BRIEF DESCRIPTION OF THE DRAWINGS

FIG. 8 is a screen shot illustrating an alternative method for displaying a terms listing, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
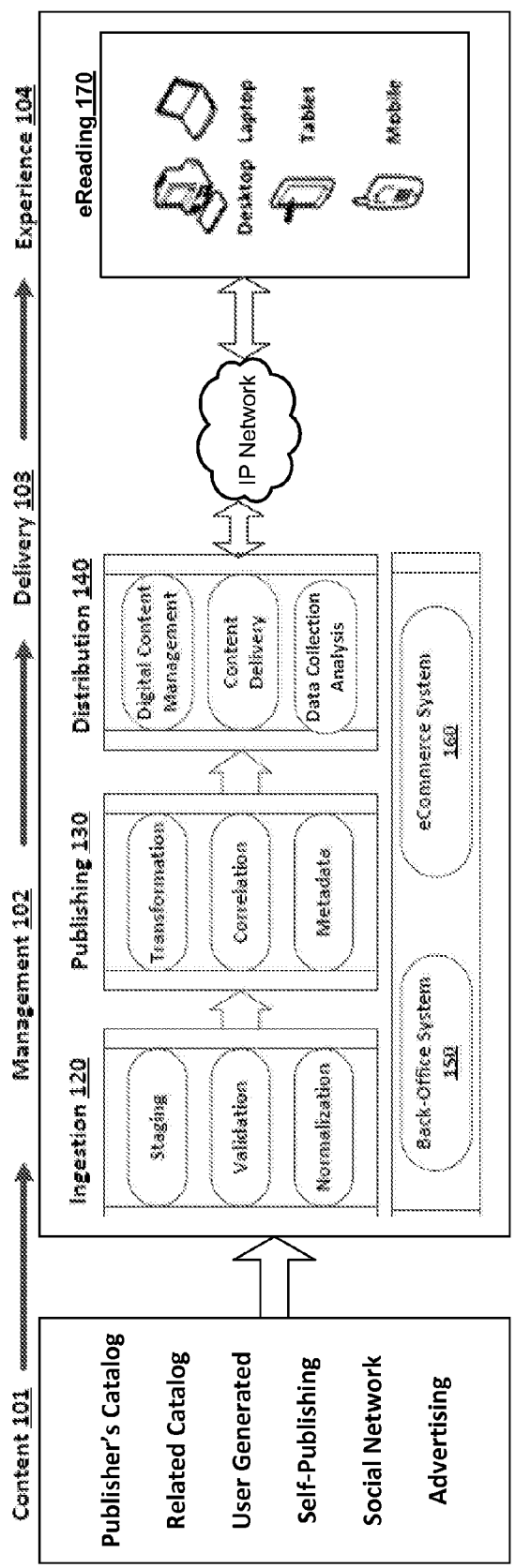
FIG. 1 illustrates an example publishing platform, according to one embodiment.

Embodiments of the invention provide a method for generating a terms listing associated with an HTML document. The method is organized around an educational digital publication and reading platform configured to aggregate, manage, and distribute multilayered content. FIG. 1 is a high-level block diagram illustrating the platform environment, organized around four function blocks: content 101, management 102, delivery 103, and experience 104.

Content block 101 automatically gathers and aggregates content from a large number of sources, categories, and partners. Whether the content is curated, perishable, on-line, or personal, these systems define the interfaces and processes to automatically collect various content sources into a formalized staging environment.

Management block 102 comprises five blocks with respective submodules: ingestion 120, publishing 130, distribution 140, back office system 150, and eCommerce system 160. The ingestion module 120, including staging, validation, and normalization subsystems, ingests published documents that may be in a variety of different formats, such as PDF, ePUB2, ePUB3, SVG, XML, or HTML. The ingested document may be a book, such as a textbook, a set of self-published notes, or any other published document, and may be subdivided in any manner. For example, the document may have a plurality of pages organized into chapters, which could be further divided into one or more sub-chapters. Each page may have text, images, tables, graphs, or other items distributed across the page.

After ingestion, the documents are passed to the publishing system 130, which in one embodiment includes transformation, correlation, and metadata subsystems. If the document ingested by the ingestion module 120 is not in a markup language format, the publishing system 130 automatically identifies, extracts, and indexes all the key elements and composition of the document to reconstruct it into a modern, flexible, and interactive HTML5 format. The ingested documents are converted into markup language documents well-suited for distribution across various computing devices. In one embodiment, the publishing system 130 reconstructs published documents so as to accommodate dynamic add-ons, such as user-generated and related content, while maintaining page fidelity to the original document. The transformed content preserves the original page structure including pagination, number of columns and arrangement of paragraphs, placement and appearance of graphics, titles and captions, and fonts used, regardless of the original format of the source content and complexity of the layout of the original document.

The page structure information is assembled into a document-specific table of contents describing locations of chapter headings and sub-chapter headings within the reconstructed document, as well as locations of content within each heading. During reconstruction, document metadata describing a product description, pricing, and terms (e.g., whether the content is for sale, rent, or subscription, or whether it is accessible for a certain time period or geographic region, etc.) are also added to the reconstructed document.

The reconstructed document's table of contents indexes the content of the document into a description of the overall structure of the document, including chapter headings and sub-chapter headings. Within each heading, the table of contents identifies the structure of each page. As content is added dynamically to the reconstructed document, the content is indexed and added to the table of contents to maintain a current representation of the document's structure. The process performed by the publishing system 130 to reconstruct a document and generate a table of contents is described further with respect to FIG. 2.

The distribution system 140 packages content for delivery, uploads the content to content distribution networks, and makes the content available to end-users based on the content's digital rights management policies. In one embodiment, the distribution system 140 includes digital content management, content delivery, and data collection and analysis subsystems.

Whether the ingested document is in a markup language document or is reconstructed by the publishing system 130, the distribution system 140 may aggregate additional content layers from numerous sources into the ingested or reconstructed document. These layers, including related content, advertising content, social content, and user-generated content, may be added to the document to create a dynamic, multilayered document. For example, related content may comprise material supplementing the foundation document, such as study guides, self-testing material, solutions manuals, glossaries, or journal articles. Advertising content may be uploaded by advertisers or advertising agencies to the publishing platform, such that advertising content may be displayed with the document. Social content may be uploaded to the publishing platform by the user or by other nodes (e.g., classmates, teachers, authors, etc.) in the user's social graph. Examples of social content include interactions between users related to the document and content shared by members of the user's social graph. User-generated content includes annotations made by a user during an eReading session, such as highlighting or taking notes. In one embodiment, user-generated content may be self-published by a user and made available to other users as a related content layer associated with a document or as a standalone document.

As layers are added to the document, page information and metadata of the document are referenced by all layers to merge the multilayered document into a single reading experience. The publishing system 130 may also add information describing the supplemental layers to the reconstructed document's table of contents. Because the page-based document ingested into the management block 102 or the reconstructed document generated by the publishing system 130 is referenced by all associated content layers, the ingested or reconstructed document is referred to herein as a "foundation document," while the "multilayered document" refers to a foundation document and the additional content layers associated with the foundation document.

The back-office system 150 of management block 102 enables business processes such as human resources tasks, sales and marketing, customer and client interactions, and technical support. The eCommerce system 160 interfaces with back office system 150, publishing 130, and distribution 140 to integrate marketing, selling, servicing, and receiving payment for digital products and services.

Delivery block 103 of an educational digital publication and reading platform distributes content for user consumption by, for example, pushing content to edge servers on a content delivery network. Experience block 104 manages user interaction with the publishing platform through eReading browser application 170 by updating content, reporting users' reading activities, and assessing network performance.

In the example illustrated in FIG. 1, the content distribution and protection system is interfaced directly between the distribution sub-system 140 and the eReading application 170, essentially integrating the digital content management (DCM), content delivery network (CDN), delivery modules, and eReading data collection interface for capturing and serving all users' content requests. By having content served dynamically and mostly on-demand, the content distribution and protection system effectively authorizes the download of one page of content at a time through time-sensitive dedicated URLs which only stay valid for a limited time, for example a few minutes in one embodiment, all under control of the platform service provider.

Document Reconstruction

The publishing system 130 receives original documents for reconstruction from the ingestion system 120 illustrated in FIG. 1. In one embodiment, a series of modules of the publishing system 130 are configured to perform the document reconstruction process.

Figure 2:
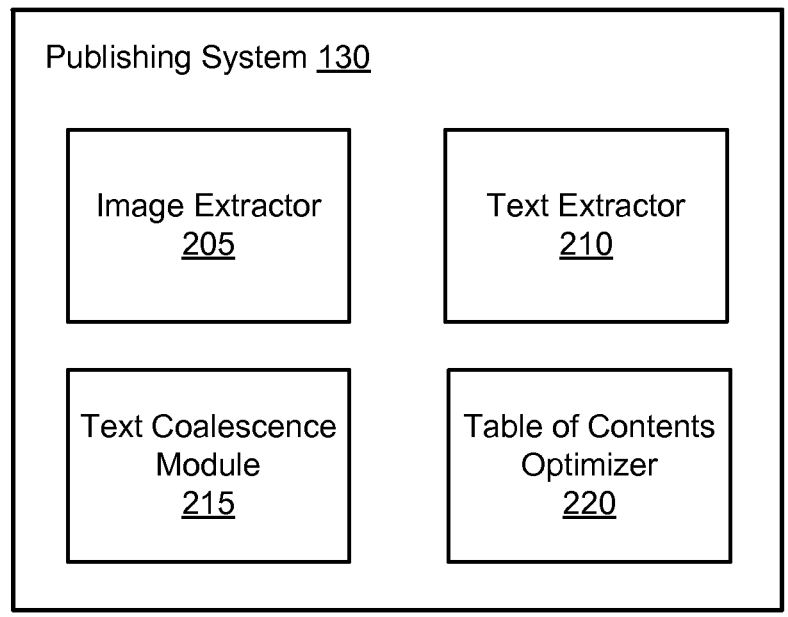
FIG. 2 is a block diagram illustrating modules within a publishing system, according to one embodiment.

FIG. 2 illustrates modules within the publishing system 130. In one embodiment, document reconstruction is performed by an image extractor 205, a text extractor 210, a text coalescence module 215, and a table of contents optimizer 220. In other embodiments, the publishing system 130 may include different and/or additional modules. Embodiments are described herein with reference to an original document in the Portable Document Format (PDF) that is ingested into the publishing system 130. However, the format of the original document is not limited to PDF; other unstructured document formats can also be reconstructed into a markup language format by a similar process.

A PDF page contains one or more content streams, which include a sequence of objects, such as path objects, text objects, and external objects. A path object describes vector graphics made up of lines, rectangles, and curves. Path can be stroked or filled with colors and patterns as specified by the operators at the end of the path object. A text object comprises character stings identifying sequences of glyphs to be drawn on the page. The text object also specifies the encodings and fonts for the character strings. An external object XObject defines an outside resource, such as a raster image in JPEG format. An XObject of an image contains image properties and an associated stream of the image data.

The image extractor 205 identifies graphical objects within a page and determines their respective regions and bounding boxes. In one embodiment, the image extraction process performed by the image extractor 205 first identifies graphical operations within the page. For example, a path object in a PDF page may include multiple path construction operators that describe vector graphics made up of lines, rectangles, and curves.

The image extractor 205 extracts metadata associated with each of the images in the document page, such as resolutions, positions, and captions of the images. Resolution of an image is often measured by horizontal and vertical pixel counts in the image; higher resolution means more image details. The image extraction process may extract the image in the original resolution as well as other resolutions targeting different eReading devices and applications. For example, a large XVGA image can be extracted and down sampled to QVGA size for a device with QVGA display. The image extractor 205 also determines the position information of each image. The position information of the images can be used to provide page fidelity when rendering the document pages in eReading browser applications, especially for complex documents containing multiple images per page. The image extractor 205 may also extract a caption associated with each image that defines the content of the image by searching for key words, such as "Picture", "Image", and "Tables", from text around the image in the original page. The extracted image metadata for the page may be stored to the overall document metadata and indexed by the page number.

The image extractor 205 may also extract tables, comprising graphics (horizontal and vertical lines), text rows, and/or text columns. The lines forming the tables can be extracted and stored separately from the rows and columns of the text.

The image extraction process may be repeated for all the pages in the ingested document until all images in each page are identified and extracted. At the end of the process, an image map that includes all graphics, images, tables and other graphic elements of the document is generated for the eReading platform.

The text extractor 210 extracts text and embedded fonts from the original document and identifies the location of the text elements on each page. In one embodiment, the text extractor 210 determines a Unicode character mapping for each glyph in a document to be reconstructed. The mapping ensures that no two glyphs are mapped to a same Unicode character. To achieve this goal, the text extractor 210 defines and follows a set of rules including applying the Unicode mapping found in the embedded font file; determining the Unicode mapping by looking up postscript character names in a standard table, such as a system TrueType font dictionary; and determining the Unicode mapping by looking for patterns, such as hex codes, postscript name variants, and ligature notations.

For those glyphs or symbols that cannot be mapped by following the above rules, the text extractor 210 may apply pattern recognition techniques on the rendered font to identify Unicode characters. If pattern recognition is still unsuccessful, the text extractor 210 may map the unrecognized characters into the private use area (PUA) of Unicode. In this case, the semantics of the characters are not identified, but the encoding uniqueness is guaranteed. As such, rendering ensures fidelity to the original document.

The text extractor 210 tags the pages in the original document having text. In one embodiment, the text extractor 210 identifies all the pages with one or more text objects in the original document. Alternatively, the text extractor 210 may mark only the pages without any embedded text.

The text extractor 210 extracts text from the pages of the original document tagged as having text. The text extraction may be done at the individual character level, together with markers separating words, lines, and paragraphs. The extracted text characters and glyphs are represented by the Unicode character mapping determined for each. The position of each character is identified by its horizontal and vertical locations within a page. For example, if an original page is in A4 standard size, the location of a character on the page can be defined by its X and Y location relative to the A4 page dimensions. In one embodiment, text extraction is performed on a page-by-page basis. The text extractor 210 may also extract embedded fonts from the original document, which are stored and referenced by client devices for rendering the text content.

The output of the text extractor 210 is, therefore, a dataset referenced by the page number, comprising the characters and glyphs in a Unicode character mapping with associated location information and embedded fonts used in the original document.

The text coalescence module 215 coalesces the text characters extracted by the text extractor 210. In one embodiment, the text coalescing module 310 assembles the extracted text characters into words, words into lines, lines into paragraphs, and paragraphs into bounding boxes and regions. These steps leverage the known attributes about extracted text in each page, such as information on the text position within the page, text direction (e.g., left to right, or top to bottom), font type (e.g., Arial or Courier), font style (e.g., bold or italic), expected spacing between characters based on font type and style, and other graphics state parameters of the pages.

In one embodiment, the text coalescence module 215 assembles extracted text characters into words based on spacing. The text coalescence module 215 may analyze the spacing between adjacent characters and compare the spacing to the expected character spacing based on the known text direction, font type, style, and size, as well as other graphics state parameters, such as character-spacing and zoom level. Despite different rendering engines adopted by the eReading applications 170, the average spacing between adjacent characters within a word is smaller than the spacing between adjacent words. For example, a string of "Berriesaregood" represents extracted characters without considering spacing information. Once taking the spacing into consideration, the same string becomes "Berries are good," in which the average character spacing within a word is smaller than the spacing between words.

The text coalescence module 215 may additionally or alternatively assemble extracted text characters into words based on semantics. For example, the string of "Berriesaregood" may be input to a semantic analysis tool, which matches the string to dictionary entries or Internet search terms, and outputs the longest match found within the string. The outcome of this process is a semantically meaningful string of "Berries are good." In one embodiment, the text coalescence module 215 analyzes the same text by both spacing and semantics, so that word grouping results may be verified and enhanced.

The text coalescence module 215 assembles words into lines by determining an end point of each line of text. Based on the text direction, the text coalescence module 215 computes and averages the horizontal spacing between words. The end point may have word spacing larger than the average spacing between words. For example, in a two-column page, the end of the line of the first column may be identified based on it having a spacing value much larger than the average word spacing within the column. On a single column page, the end of the line may be identified by the space after a word extending to the side of the page or bounding box.

After determining the end point of each line, the text coalescence module 215 assembles lines into paragraphs. Based on the text direction, the text coalescence module 215 may compute and average the vertical spacing between consecutive lines. The end of the paragraph may have a vertical spacing that is larger than the average. Additionally or alternatively, the text coalescence module 215 may apply semantic analysis to relate syntactic structures of phrases and sentences, so that meaningful paragraphs can be formed.

The text coalescence module 215 assembles the identified paragraphs into bounding boxes or regions. In one embodiment, the paragraphs may be analyzed based on lexical rules associated with the corresponding language of the text. The text coalescence module 215 may execute a semantic analyzer to identify punctuation at the beginning or end of a paragraph. For example, a paragraph may be expected to end with a period. If the end of a paragraph does not have a period, the paragraph may continue either on a next column or a next page. The text coalescence module 215 may analyze the syntactic structures of the paragraphs to determine the text flow from one paragraph to the next, and may combine two or more paragraphs based on the syntactic structure. If multiple combinations of the paragraphs are possible, the text coalescence module 215 may reference an external lexical database, such as WORDNET®, to determine which paragraphs are semantically similar.

The table of contents optimizer 220 indexes content of the reconstructed document. In one embodiment, the table of contents optimizer 220 aggregates the indexed content into a document-specific table of contents that describes the structure of the document at the page level. For example, when converting printed publications into electronic documents with preservation of page fidelity, it may be desirable to keep the digital page numbering consistent with the numbering of the original document pages.

The table of contents optimizer 220 may optimize different levels of the table. At the primary level, the table of contents optimizer 220 searches for chapter headings within the original document, such as headings for a preface, chapter numbers, chapter titles, an appendix, and a glossary. The table of contents optimizer 220 may identify a chapter heading based on the spacing between chapters. Alternatively, the table of contents optimizer 220 may identify a chapter heading based on the font face, including font type, style, weight, or size. For example, the headings may have a font face that is different from the font face used throughout the rest of the document. After identifying the headings, the table of contents optimizer 220 retrieves the number of the page on which each heading is located.

At a secondary level, the table of contents optimizer 220 searches for sub-chapter headings within the original document, such as dedications and acknowledgments, section titles, image captions, and table titles. The table of contents optimizer 220 may determine the vertical spacing between sections and segment each chapter according to the section spacing. Based on text at the beginning of each section, for example, the table of contents optimizer 220 identifies a sub-chapter heading font face. The table of contents optimizer 220 may parse each chapter to identify all occurrences of the sub-chapter heading font face, and determine the page number associated with each identified sub-chapter heading.

HTML5 eReading Environment

Figure 3:
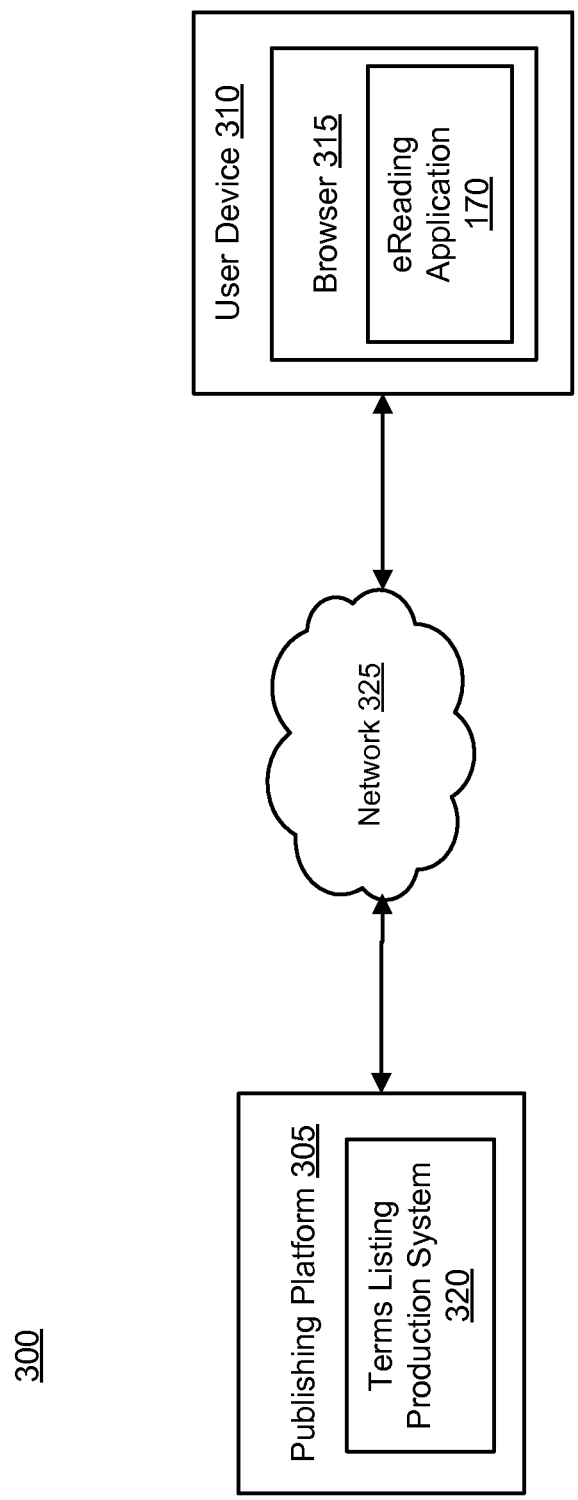
FIG. 3 illustrates an eReading environment, according to one embodiment.

FIG. 3 illustrates an eReading environment 300 including a publishing platform 305 and a user device 310. One user device 310 is illustrated in FIG. 3, but any number of user devices 310 may communicate with platform 305 to access the content distributed by platform 305. Each device 310 executes a web browser 315 and at least one eReading application 170. In one embodiment, each user is associated with an account on the publishing platform 305, and content purchased by the user through the platform 305 is made available through the user account. In one embodiment, the user device 310 may also be registered to the account to authorize the device for accessing content. Alternatively, the publishing platform 305 may establish an authenticated web session on a device 310 when the user requests to access content of the platform 305 from the device 310. Furthermore, a user may access and interact with multilayered content synchronously on a plurality of devices 310. For example, a user may simultaneously use one or more devices 310, such as a desktop computer, a laptop, a smart phone, a tablet, an eReader, an Internet television, or any other device including computing functionality and data communication capabilities, to interact with a multilayered document distributed by the publishing platform 305.

Aspects of the publishing platform 305 may function similarly to the systems 120, 130, and 140 described with reference to the management block 102 of FIG. 1. The publishing platform 305 delivers multilayered content to the eReading browser application 170 executing on the user device 310 through the network 325. The eReading application 170 fetches content from the platform 305 in small increments, such as one page at a time. Alternatively, the user device 310 may cache one or more pages of the document to enable faster retrieval of the pages.

Contrary to other existing digital publishing services, the educational digital publication and reading platform of the present invention allows the user to access content without downloading a specific reading application from the publisher. Rather, the eReading application 170, comprising client software compatible with the web browser 315, constructs document pages using structureless HTML5 elements. It should be noted that eReading applications 170 comprise eReading applications as well as supplemental content applications that function in the browser environment to support the user's eReading activities and overall engagement with the multilayered documents distributed by the platform, such as notepad applications, social applications, and advertising applications. In one embodiment, the eReading application 170 integrates a number of a user's reading activities, including reading the content, navigating between pages, creating highlights, interacting with advertisements, generating social content, taking notes in relation to the content of the document, and searching the document.

For example, the eReading application 170 may upload user-generated content to the publishing platform 305. The uploaded user-generated content is stored and archived into the on-line end user account so that it may be synchronized across all registered devices 310 for a given end user. Thus, the end user's content can be accessed from any of the user's registered devices.

As another example, the eReading application 170 may enable users to search the foundation document and/or documents related to the foundation documents for terms appearing in the documents. As users read and interact with the multilayered document through the eReading browser applications 170, the eReading application 170 uploads a record of the users' searches to the publishing platform 305. For example, because the eReading application 170 may only have access to a limited portion of the multilayered document at any given time, the eReading application 170 may transmit the users' searches to the publishing platform 305. Each transmitted search may include a term specified in each search and an identifier of the document being searched. Based on the data generated by the text coalescence module 215 identifying words, lines, and paragraphs of the foundation document, including their X/Y page locations, the platform 305 determines the locations (if any) of the searched terms in the identified document and returns the determined locations to the eReading application 170. For example, the platform 305 may return a page of links to the locations in the foundation document on which the searched term appears. In response to a user selection of one of the links, the eReading application 170 retrieves the corresponding document page from the platform 305 and presents the page to the user.

In one embodiment, the publishing platform 305 executes a terms listing production system 320. The terms listing production system 320 identifies terms of a foundation document and definitions of the terms. Based on the identified terms and associated definitions, the terms listing production system 320 generates a stand-alone HTML terms listing document configured for presentation to users through the eReading browser applications 170. The terms listing document supports a user's comprehension of the foundation document by providing definitions of the important terms of the foundation document, for example on the page the user is currently reading, without requiring the user to leave the current page.

Communication between the publishing platform 305 and user device 310 is enabled by network 325. In one embodiment, the network 325 uses standard communications technologies and/or protocols. Thus, the network 325 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 325 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 325 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 325 can also include links to other networks such as the Internet.

Figure 4:
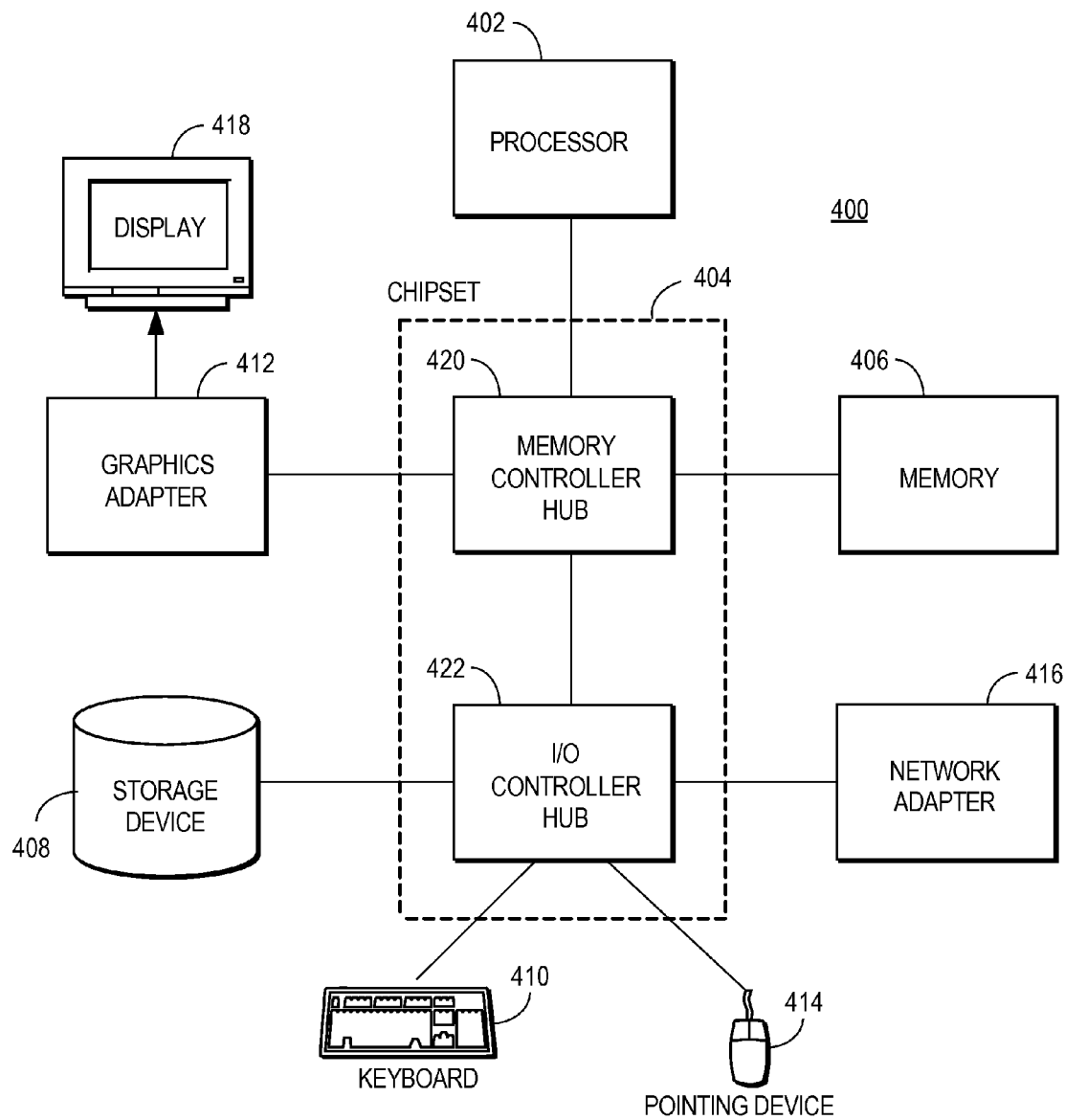
FIG. 4 is a high-level block diagram of a computer for use as a client device, according to one embodiment.

A high-level block diagram of a computer 400, as an example of a user device 310, is illustrated in FIG. 4. Illustrated are at least one processor 402 coupled to a chipset 404. The chipset 404 includes a memory controller hub 420 and an input/output (I/O) controller hub 422. A memory 406 and a graphics adapter 412 are coupled to the memory controller hub 420, and a display device 418 is coupled to the graphics adapter 412. A storage device 408, keyboard 410, pointing device 414, and network adapter 416 are coupled to the I/O controller hub 422. Other embodiments of the computer 400 have different architectures. For example, the memory 406 is directly coupled to the processor 402 in some embodiments.

The storage device 408 is a non-transitory computer-readable storage medium such as a hard drive, compact disk read-only memory (CD-ROM), DVD, or a solid-state memory device. The memory 406 holds instructions and data used by the processor 402. The pointing device 414 is a mouse, track ball, or other type of pointing device, and is used in combination with the keyboard 410 to input data into the computer 400. The graphics adapter 412 displays images and other information on the display device 418. The network adapter 416 couples the computer 400 to a network. Some embodiments of the computer 400 have different and/or other components than those shown in FIG. 4. The types of computer 400 can vary depending upon the embodiment and the desired processing power. Other computing devices may alternatively be used as the user device 310, such as a tablet, a smart phone, an Internet television, or a gaming console.

Terms Listing Production

Figure 5:
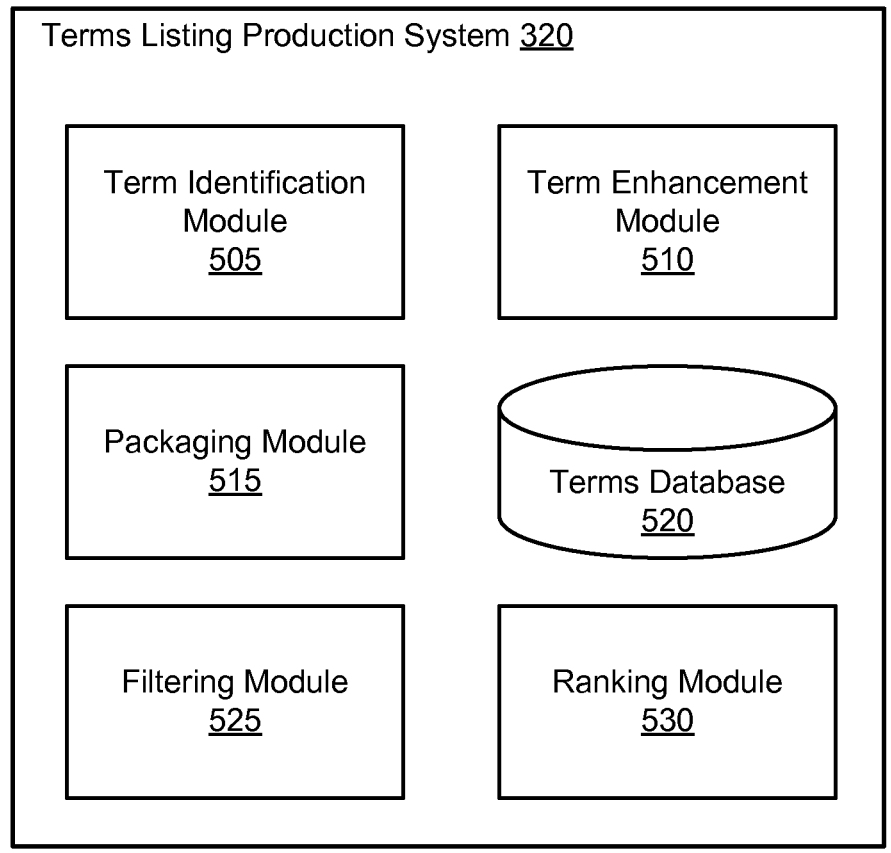
FIG. 5 is a block diagram illustrating modules within the terms listing production system, according to one embodiment.

FIG. 5 is a block diagram illustrating modules within the terms listing production system 320. In one embodiment, the terms listing system 320 includes a term identification module 505, a term enhancement module 510, a packaging module 515, a terms database 520, a filtering module 525, and a ranking module 530. Other embodiments of the terms listing production system 320 include fewer or more modules, and distribute the functionalities among the modules in a different manner.

Term Identification

The term identification module 505 identifies primary terms and primary definitions of the foundation document. As used herein, a "primary term" is a term occurring in a glossary associated with a foundation document. Similarly, a "primary definition" is a definition that occurs in a glossary and is associated with a primary term. Typically, a glossary is a listing of terms in a table view separated from the rest of the document by a heading or sub-heading, usually including a combination of a term, a definition associated with the term, and a page number indicating the location(s) at which the term appears in the associated document. However, the glossary need not include all of these components; for example, the glossary may only list a term and its definition without a page number. Because the glossary is appended to an original document by the author or publisher of the document and associated with the licensing rights of the document, primary terms and primary definitions may be statically associated with a particular foundation document.

In one embodiment, the term identification module 505 identifies the primary terms of a foundation document by accessing a glossary associated with the document. Based on the data generated by the table of contents optimization process, the term identification module 505 identifies the page locations within the foundation document having glossary-specific content. For example, the term identification module 505 may identify the page locations by searching through the headers in the table of contents for keyword data fields such as, for example, "Glossary," "Dictionary," or "Lexicon."

After identifying the pages and sections of the foundation document corresponding to the glossary, the term identification module 505 analyzes the data generated by the text coalescence module 215. Analysis may include determining a list of primary terms on each page of the glossary, and identifying a primary definition associated with each primary term. In particular, the term identification module 505 uses the data generated by the text coalescence module 215 identifying words, lines, and paragraphs, as well as their locations on each page of the foundation document.

In one embodiment, the term identification module 505 determines primary terms by searching for patterns specific to the glossary. For example, the glossary may be presented as a list of terms that are each associated with a definition, such that the structure of sentences in the glossary may be distinct from the structure of other sentences in the original document. Accordingly, the term identification module 505 may search for stand-alone words or expressions that are separated from lines or paragraphs of text by spacing, font style, size, or location on the page.

The term identification module 505 may similarly identify primary definitions associated with each primary term. Lines or paragraphs of the glossary immediately following each primary term may be extracted as the primary definition. For example, the primary definition may be a line of text immediately following a primary term in the glossary that is separated from the next primary term by a paragraph break.

The term identification module 505 stores each primary term and its associated primary definition in the terms database 520. In one embodiment, the terms identification module 505 associates each term in the database 520 with metadata identifying the page(s) of the foundation document on which the term appears. The page locations may be retrieved from the glossary, or determined based on the data generated by the text coalescence module 215 specifying the locations of the terms in the foundation document.

Terms Enhancement

The term enhancement module 510 enhances a set of terms associated with a foundation document by identifying secondary terms and secondary definitions of a foundation document. As used herein, a particular document's "secondary terms" are terms not originally appearing in the document's glossary, but are associated with the document based on user or platform activities. "Secondary definitions" may be content, such as basic definitions, enhanced definitions, or other related content, associated with either primary or secondary terms but not appearing in a foundation document's original glossary.

In one embodiment, the term enhancement module 510 determines secondary terms based on users' searches in relation to the foundation document. As eReading browser applications 170 transmit users' searches to the publishing platform 305, the platform 305 may receive and compile a dynamic listing of the terms searched by a plurality of users ("crowd-searched terms") in relation to a particular foundation document. The term enhancement module 510 may filter the crowd-searched terms to remove any primary terms, and save the remaining crowd-searched terms in the terms database 520 as secondary terms. Additional filtering may also be performed. For example, the term enhancement module 510 may filter the crowd-searched terms based on the number of times users have searched for each term, and may only add the top N (e.g., two hundred) most frequently searched terms to the terms database 520.

In another embodiment, the term enhancement module 510 determines secondary terms by retrieving terms from terms listings associated with similar foundation documents. The similarity of foundation documents may be determined based on subject matter of the documents. For example, a "Biology 101" textbook may be similar to "Biology 102" and "Biology 103" textbooks based on the three textbooks sharing the subject matter of biology. The term enhancement module 510 may generate a list of secondary terms associated with "Biology 101" by retrieving primary or secondary terms associated with each of the "Biology 102" and "Biology 103" textbooks.

The term enhancement module 510 may retrieve secondary definitions for primary terms and secondary terms from documents external to the foundation document with which the terms are associated. The external documents may be documents identified by the distribution system 140 as being related to the foundation document, other documents distributed by the publishing platform 305, or documents from external sources. In one embodiment, the term enhancement module 510 retrieves a secondary definition of a primary or secondary term from an online dictionary.

In another embodiment, the term enhancement module 510 retrieves secondary definitions by feeding terms into an online translation system. Based on the type of translation system, new references are extracted, paired to individual terms, and added to the terms database 520 in association with the paired term. For example, by feeding a primary term into a dictionary for a language other than the language of the foundation document, the terms enhancement module 510 translates the primary term from its original language into a second language. The translation process may involve translating the term from the original language to the second language, applying the translated term to a dictionary specific to the second language to determine its definition, extracting the definition from the second language dictionary, and save the definition in the second language as a secondary definition for the primary term. The terms enhancement module 510 may also retrieve phonetic-based audio playback pronunciations of the term from the dictionary in the second language, and save the pronunciations in the terms database 520.

In yet another embodiment, the term enhancement module 510 retrieves secondary definitions by feeding terms into an online thesaurus that lists keywords and their associated synonyms and/or antonyms. By feeding a term into an online thesaurus, the term enhancement module 510 may generate new references that are extracted, paired to the term, and added to the terms database 520 in association with the paired term. The term enhancement module 510 may additionally or alternatively feed translated terms into a thesaurus specific to the language of the translated term to obtain a list of synonyms and/or antonyms of the term in the second language.

When retrieving content from external documents, the term enhancement module 510 may limit the number of related content matches that can be paired with the foundation terms by limiting its queries based on content type or number of matches. For example, a query for related content may search only for a particular type of content, such as video clips or book excerpts that relate to the foundation terms. As another example, a query for related content may search through all possible content types but only list the top N results, where N may for example be five.

Terms Delivery

The packaging module 515 packages the terms and definitions identified by the term identification module 505 and the term enhancement module 510 for delivery by the distributions system 140. In one embodiment, the packaging module 515 retrieves terms and definitions from the terms database 520 and generates markup language elements for delivery to eReading browser applications 170. For example, the packaging module 515 may map each data field in the terms database 520 to a unique HTML document region. The markup language document generated by the packaging module 515 is referred to herein as a "terms listing document," but each region may be independently delivered to and reconstructed by the eReading browser applications 170. The regions may support content in a variety of formats, such as text, links, bitmaps, or multimedia. Moreover, each region may inherit the metadata associated with the corresponding term. Various examples of delivering the regions of the terms listing document to client devices 310 are described with respect to FIGS. 6-9.

In one embodiment, the HTML regions generated by the packaging module 515 can be customized by users. For example, a registered user may be granted owner's rights to a terms listing HTML document. By interacting with the eReading browser application 170, the registered user may edit content of the regions or add new regions to the existing terms listing document.

In one embodiment, the packaging module 515 configures all primary and secondary terms associated with a foundation document, as well as all primary and secondary definitions, for presentation to users. That is, the packaging module 515 configures the terms and definitions to enable users to access all primary and secondary terms and definitions that have been associated with a given foundation document for as long as the foundation document has been available for distribution by the publishing platform 305. In another embodiment, the filtering module 525 filters the terms in the terms database 520 before the markup language regions are delivered to client devices 130. Filters that may be applied by the filtering module 525 include social graph-based filtering, web sessions-based filtering, and web sessions page-based filtering.

By social graph-based filtering, the filtering module 525 filters the terms listing based on the activities of users connected to one another in a social graph. For example, users may be connected based on their mutual registration in a certain course, enrollment at a particular institution, or other connections. In one embodiment, the filtering module 525 filters the crowd-searched terms to include only the terms searched by users connected in a social graph, such as students registered to the same class or academic course as the student's progress through the course and access the same foundation document.

By web sessions-based filtering, the filtering module 525 filters the terms listing based on activities of users within a particular eReading web session. In one embodiment, the filtering module 525 may filter the crowd-searched terms to generate a substantially real-time listing of terms searched by students registered for the same course. For example, if students in a course are studying for an exam at the same time, the filtering module 525 may filter the terms searched by the students corresponding to the time they are studying for the exam. The filtering module 525 may determine a time of each search, and filter the secondary terms based on at least one of the times.

By web sessions page-based filtering, the filtering module 525 filters the terms listing based on the page locations of the terms. For example, the terms listing may include terms from the entire foundation document. If a user is accessing only a couple pages of the document at a given time, the user may desire to view only the terms that appear on the pages they are accessing. Thus, the filtering module 525 may filter the primary and/or secondary terms in the terms listing based on the page number associated with each term, and pass only the terms appearing on the pages currently being accessed by the user.

After a filter has been applied, the regions of the terms listing document corresponding to the terms that were not filtered out are delivered to devices 310 for rendering by the eReading browser applications 170. Based on the applied filter, different users may be presented with different sets of terms and definitions. For example, two students use the same textbook and both apply a web sessions-based filter, but the two students are registered to different courses. Because the students registered to each of the two courses may search for different terms in the textbook, the two students are presented with different terms after applying a web sessions-based filter. Moreover, the terms displayed to one student may be different at different times, depending on the searches of other users in the student's social graph or registered courses.

The ranking module 530 generates a ranking for the terms filtered by the filtering module 525. Rankings may be generated based on a number of different factors, such as the alphabetical order of the terms, the number of times a primary or secondary term appears in the foundation document, or the number of times users have searched for a particular term. Depending on the type of filtering applied, the rankings may be generated at different frequencies. For example, if no filtering is applied, the ranking module 530 may generate a ranking on a relatively infrequent basis, such as once per day. If web sessions-based filtering is applied, the ranking module 530 may generate a ranking on a more frequent basis, such as several times per day. Moreover, the ranking module 530 may clear the generated rankings between course cycles, such as at the end of a semester. The generated ranking may be used to present terms to users. For example, the eReading browser application 170 may display the highest-ranked above the lower-ranked terms.

Presenting Terms Listings in HTML Document Web Sessions

As discussed above, the terms listing production system 320 generates terms listings associated with electronic documents that may include primary terms, primary definitions, secondary terms, and secondary definitions. By generating markup language regions for each term or definition that can be independently delivered to an eReading browser application 170, the terms listing production system 320 provides several ways for users to view and interact with terms listings as an aid in their studying.

Registered users access foundation documents distributed by the publishing platform 305 through eReading browser applications 170 executing on their devices 310. As a user reads a foundation document, the user may wish to access the terms listing associated with the document, for example, to read a definition of a term, access other information about the term, or find other pages on which the term appears. FIGS. 6-9 illustrate various examples of user interfaces by which users may access terms listings.

Figure 6:
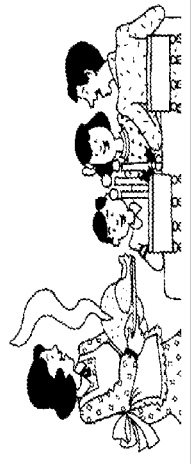
FIG. 6 is a screen shot illustrating a list of terms presented in a panel adjacent to a foundation document page, according to one embodiment.

FIG. 6 is a screen shot illustrating a list of terms presented in a panel 610 adjacent to a page 605 of a foundation document. The document page 605, terms 615A-C, primary definitions 620A-B, and secondary definitions 625A and 625C are accessed by an eReading browser application 170 and presented to a user by the user's device 310. The panel 610 may have been launched in response to a user interaction with an interface element of the eReading application 170. When the panel 610 is launched, the eReading browser application 170 retrieves the terms 615 and definitions 620, 625 from the terms database 520 and displays each within a unique window in the panel 610.

The panel 610 includes a header 625 identifying the foundation document being accessed, one page of which is the document page 605, as well as a number of independent windows 630. For example, each region of the terms listing document may be mapped to a window 630 in the panel 610.

As illustrated in FIG. 6, terms can be presented to users with one or more of their associated definitions. The terms illustrated in FIG. 6 may be either primary terms or secondary terms, or both. Term 615A is presented in a window 630, with its primary definition 620A and secondary definition 625B mapped to windows following the window 630. Term 615B is presented only with its primary definition 620B, whereas term 615C is presented only with a secondary definition 625C. For example, no primary definition may have been identified for term 615C because term 615C is a secondary term. Alternatively, the user may select a setting specifying which definitions are to be displayed (e.g., "Display Only Primary Definitions"). Terms may alternatively be presented independently in the panel 610, without their associated definitions. In another embodiment, the panel 610 may include sub-headers separating primary terms from secondary terms.

Figure 7A:
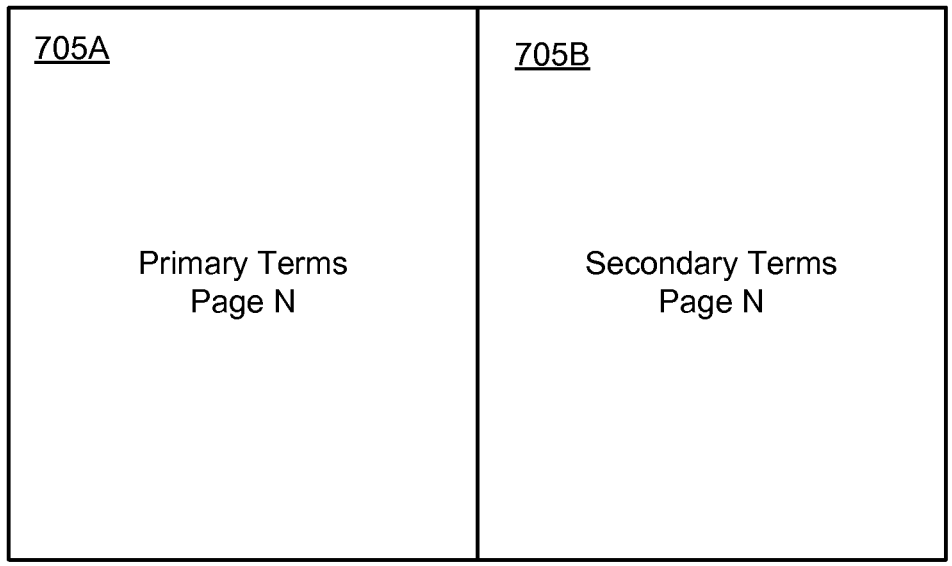
FIG. 7A is a schematic illustrating primary terms displayed in a panel adjacent to secondary terms, according to one embodiment.
Figure 7B:
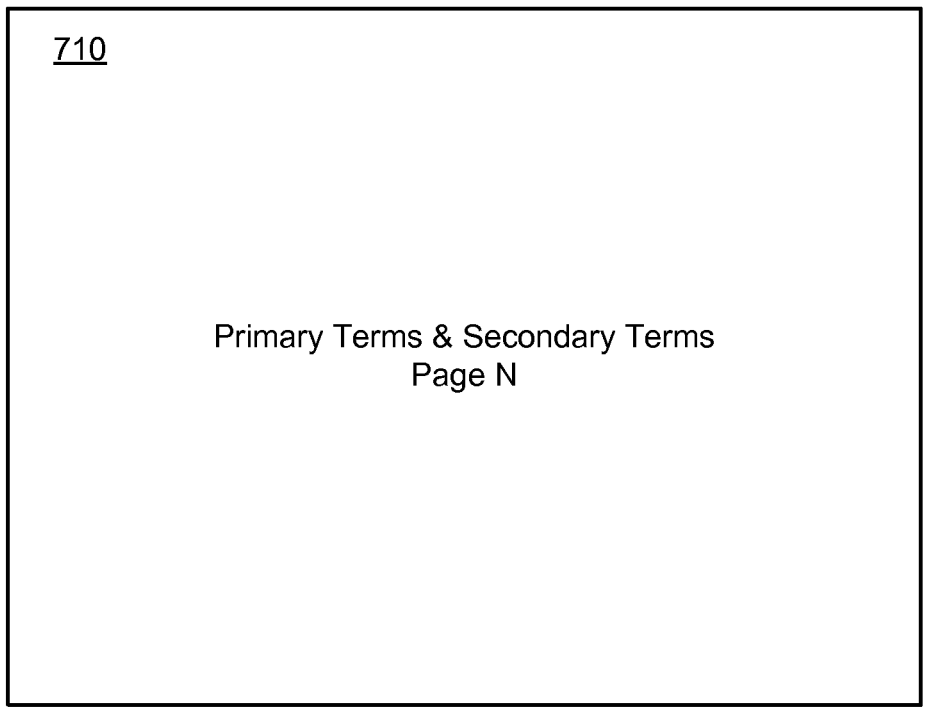
FIG. 7B is a schematic illustrating primary terms and secondary terms displayed in the same panel, according to one embodiment.

An alternative method for displaying terms listings to users is illustrated in FIGS. 7A-B. FIG. 7A is a schematic illustrating primary terms and secondary terms displayed in adjacent panels. For example, panel 705A contains a listing of primary terms associated with page N of a foundation document. Each primary term may be displayed with its associated primary and/or secondary definitions. Panel 705B contains a listing of secondary terms associated with page N, and may display each secondary term with its associated secondary definition. FIG. 7B illustrates primary and secondary terms associated with page N combined into a single panel 710. The panels 705A, 705B, and 710 may be displayed adjacent to a document page, similar to the display of the panel 610 in FIG. 6, or may be displayed independently of a document page.

Figure 8:
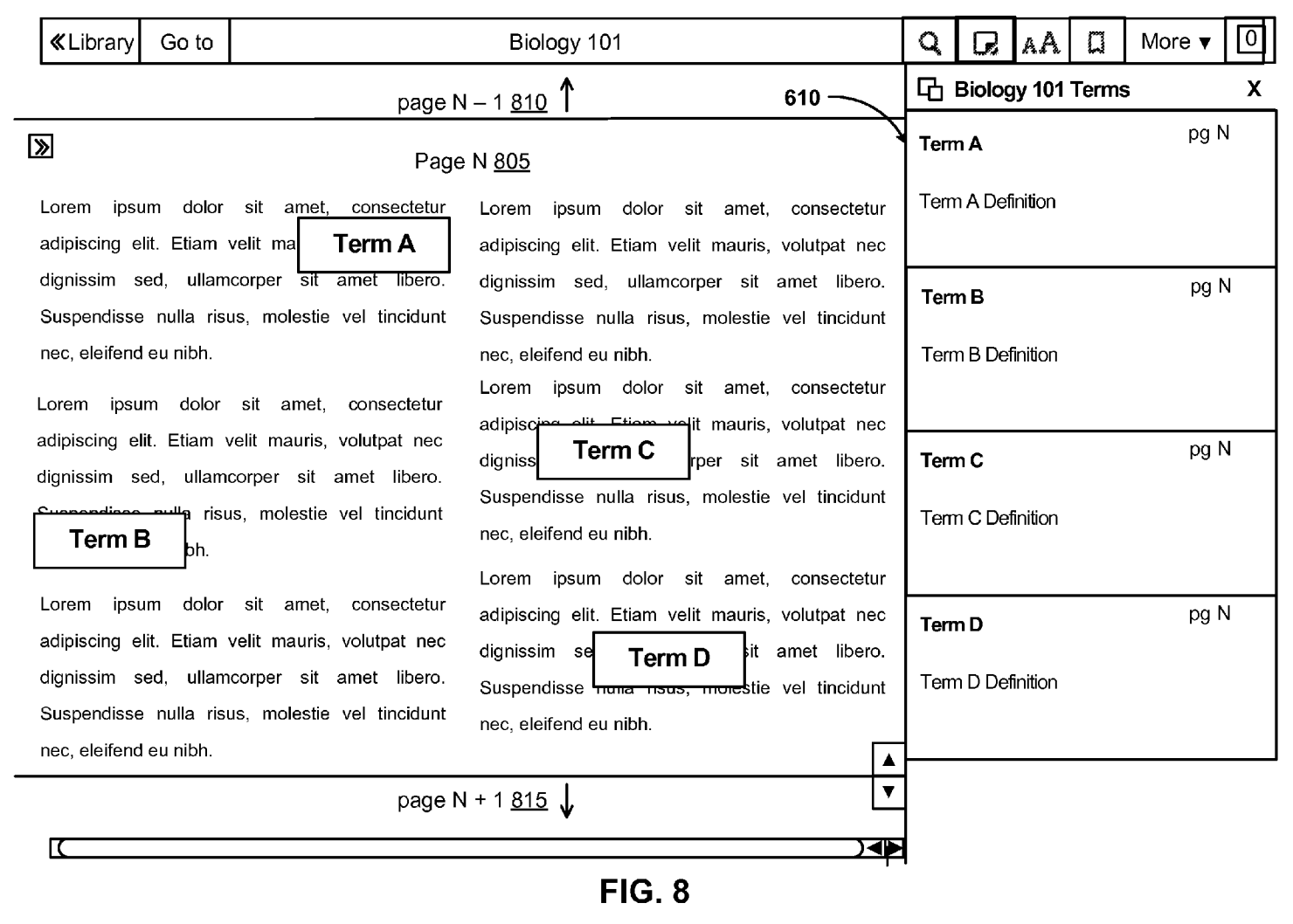

Another method for displaying terms listings is illustrated in FIG. 8. FIG. 8 illustrates a screen shot of a document page (N) 805, preceded by page (N−1) 810 and followed by page (N+1) 815. Four terms and their associated definitions are displayed to the user within the terms panel 610, corresponding to four terms appearing in the text of page (N) 805. The terms may be primary or secondary terms, and the definitions may be primary and/or secondary definitions. To generate the display illustrated in FIG. 8, the terms listing production system 320 may have applied a web session page-based filter to the terms listing associated with the foundation document being displayed by the eReading browser application 170. As the user navigates through the foundation document, the terms listing production system 320 filters the terms listing to effectively synchronize the user's reading activities with available terms and definitions. For example, when the user navigates to page (N+1) 815, the terms listing production system 320 may filter the terms listing based on which terms appear on page (N+1) 815, and push the identified terms or terms and definitions to the eReading application 170 for display to the user in the panel 610. The terms listing production system 320 may determine which terms appear on a given page, and therefore which terms to push to the eReading application 170, based on the data generated by the text coalescence module 215.

Figure 9:
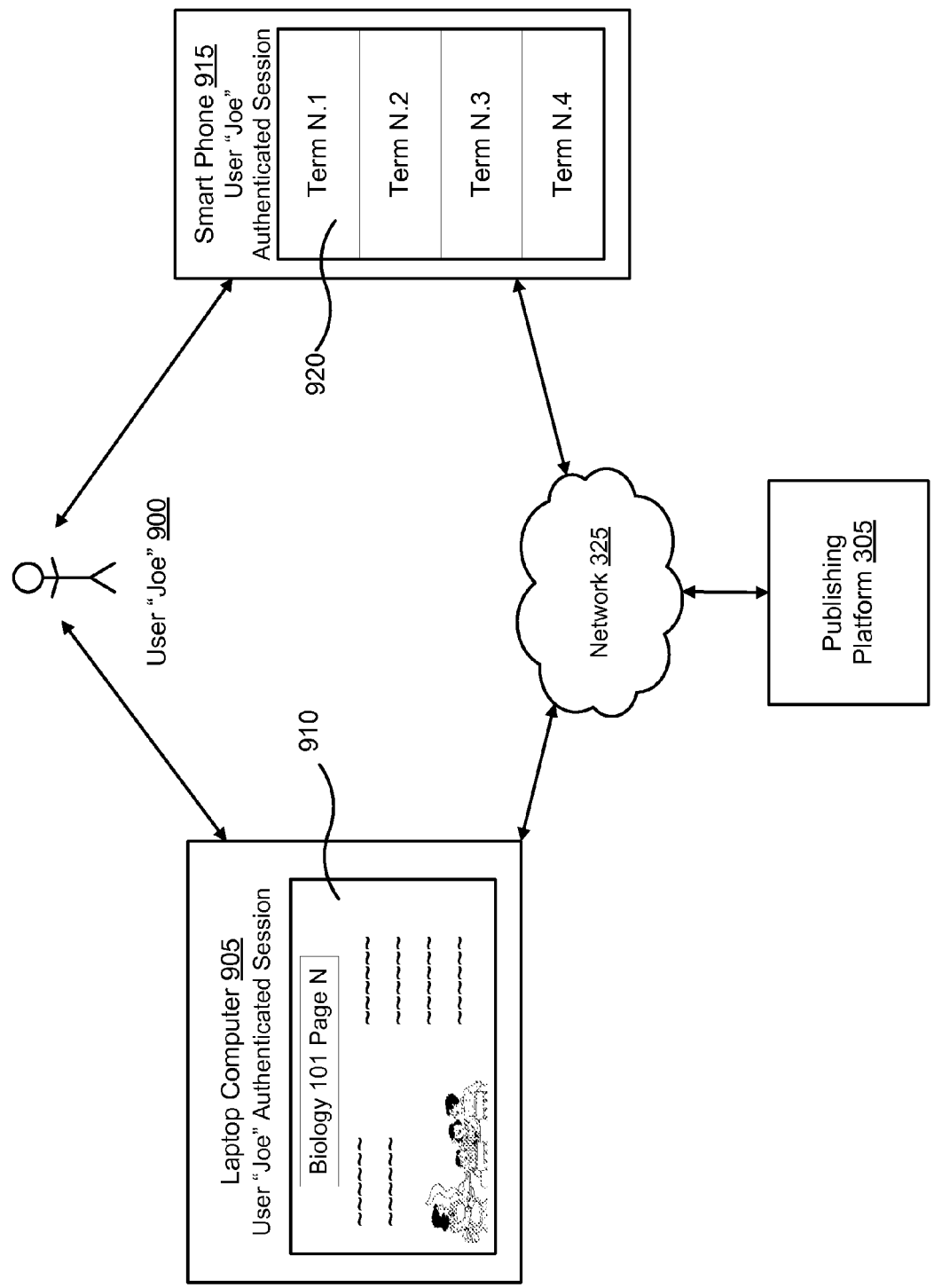
FIG. 9 is a block diagram illustrating a terms listing displayed in a multiscreen environment, according to one embodiment.

FIG. 9 illustrates yet another method for displaying terms listings to users. Because users may access their account with the publishing platform 305 through authenticated web sessions on a plurality of devices, simultaneously accessing content of the platform 305 on these devices, a document may be accessed from one device while terms and definitions are accessed from a second device. The example illustrated in FIG. 9 includes a user "Joe" 900 accessing content of the publishing platform 305 through authenticated web sessions on a laptop computer 905 and a smart phone 915 via the network 325, though different and/or additional devices may be used.

As illustrated in FIG. 9, the user "Joe" 900 is accessing page N of a foundation document 910 on the laptop 905. At the same time, the user is accessing terms 920 (which may be primary, secondary, or both) on the smart phone 915. The terms 920 may be synchronized with the user 900's reading activities related to the document 910. For example, the terms 920 displayed on the smart phone 915 are terms appearing on page N of the document 910, currently displayed on the laptop 905. If the user 900 were to navigate to page N+1, the platform 305 may update the terms 920 by pushing the terms appearing on page N+1 to the smart phone 915. Additionally or alternatively, the user 900 may be able to scroll through the terms 920 to access terms associated with other pages of the document 910 while page N is displayed on the laptop 905. In one embodiment, a user can interact with a term on the smart phone 915 (e.g., click on the term) to change the page displayed on the laptop 905. The platform 305 receives the user selection of the term, determines a page of the document 910 on which the term appears, and pushes the determined page to the laptop 905 for presentation to the user.

Figure 10:
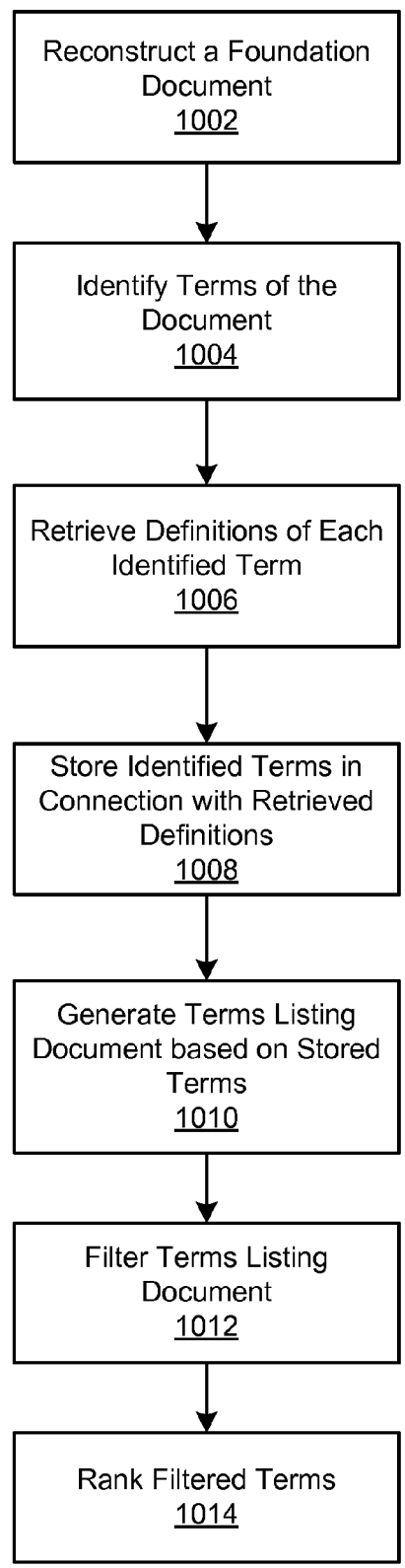
FIG. 10 is a flowchart illustrating a high-level method for generating a terms listing associated with an electronic document, according to one embodiment.

FIG. 10 is a flowchart illustrating a high-level method for generating a terms listing associated with a foundation document. In one embodiment, the steps of the method are performed by the publishing platform 305. Other embodiments perform the illustrated steps in different orders, and/or perform different or additional steps. Moreover, some of the steps may be performed by modules other than the publishing platform 305.

The publishing platform 305 reconstructs 1002 a foundation document to identify locations of content within the document. The reconstruction may identify locations of sections within the document, such as the page numbers corresponding to chapters, as well as locations of individual words, lines, and paragraphs on each page. The publishing platform 305 identifies 1004 terms of the foundation document. In one embodiment, the terms listing production system 320 identifies 1004 primary terms by identifying a glossary associated with the foundation document. The publishing platform 305 extracts the primary terms from the identified glossary. In another embodiment, the publishing platform 305 identifies 1004 secondary terms by receiving terms searched by users in relation to the foundation document. If a term is searched by a plurality of users, the term is saved as a secondary term of the document.

The publishing platform 305 retrieves 1006 definitions of each primary or secondary term. The definitions may be retrieved 1006 from the glossary of the foundation document: the publishing platform 305 extracts primary definitions from the glossary corresponding to each primary term extracted from the glossary, based on the data generated by reconstruction of the document. Alternatively, the publishing platform 305 may retrieve 1006 a secondary definition of each term from an external document, such as an electronic dictionary.

The publishing platform 305 stores 1008 the terms in connection with the primary and/or secondary definitions. Based on the stored terms and their associated definitions, the publishing platform 305 generates 1010 a markup language terms listing document that is configured for presentation to users through eReading browser application 170. Optionally, after generating 1010 the terms listing document, the publishing platform 305 may filter 1012 the terms in the terms listing document, and rank 1014 the filtered terms.

Figure 11:
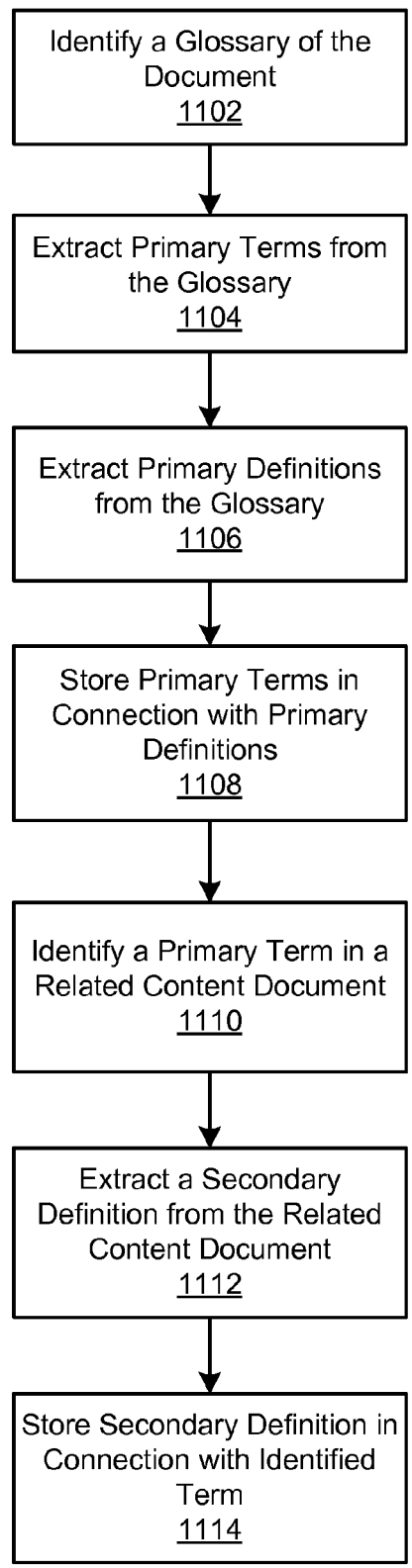
FIG. 11 is a flowchart illustrating a method for determining primary and secondary definitions associated with a primary term, according to one embodiment.

FIG. 11 is a flowchart illustrating a particular use case of the method of FIG. 10. In one embodiment, the steps of the method are performed by the publishing platform 305. Other embodiments perform the illustrated steps in different orders, and/or perform different or additional steps. Moreover, some of the steps may be performed by modules other than the publishing platform 305.

The publishing platform 305 identifies 1102 a glossary associated with a foundation document. Primary terms are extracted 1104 from the glossary, and primary definitions corresponding to each extracted primary term are extracted 1106 from the glossary. The publishing platform 305 stores 1108 the extracted primary terms in connection with the primary definitions.

The publishing platform 305 identifies 1110 a primary term occurring in a related content document. For example, the publishing platform 305 may identify 1110 a primary term occurring in an online dictionary, thesaurus, or encyclopedia. Content of the related content document is extracted 1112 as a secondary definition of the identified primary term, and stored 1114 in connection with the identified primary term.

Figure 12:
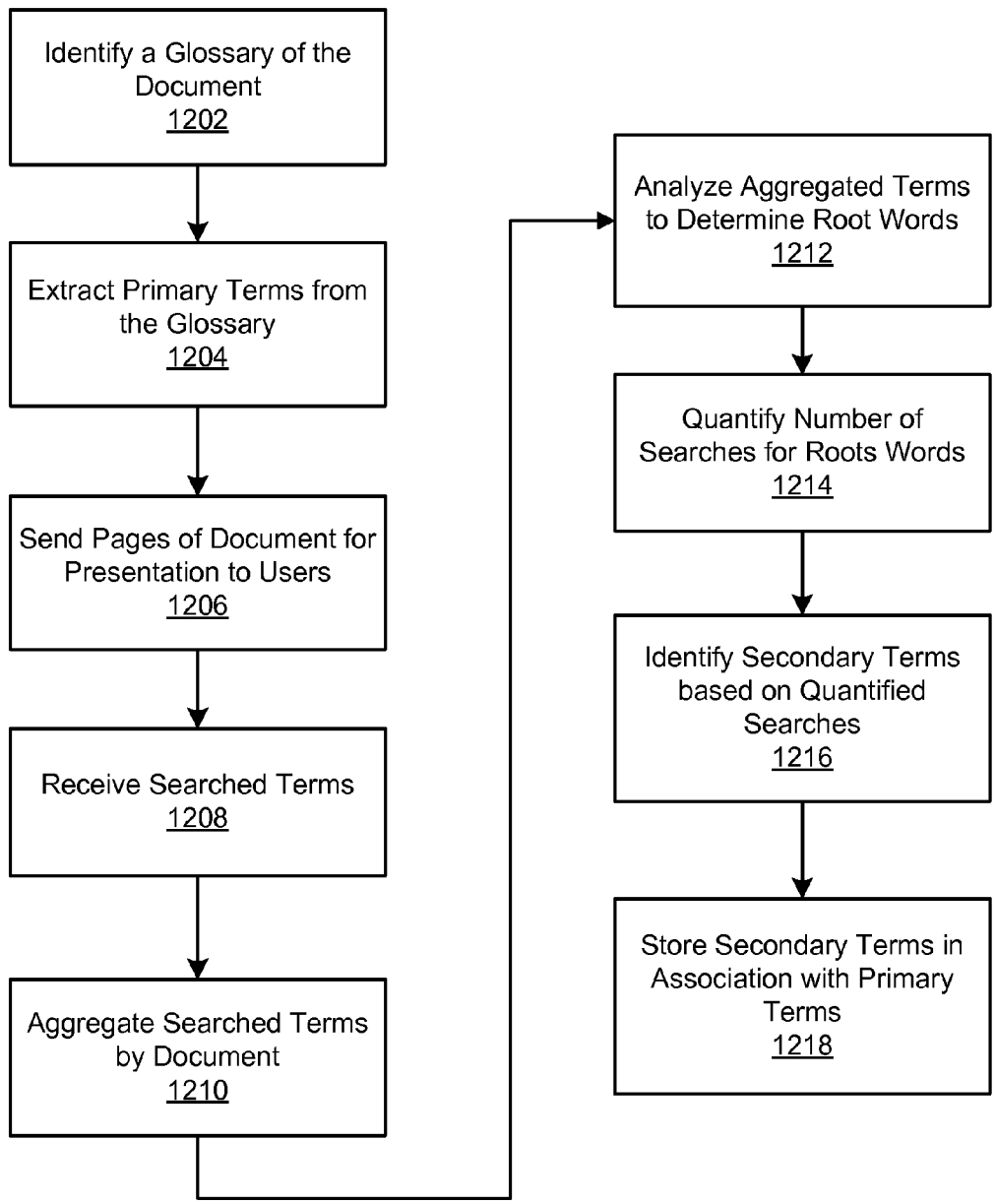
FIG. 12 is a flowchart illustrating a method for determining primary and secondary terms associated with an electronic document, according to one embodiment.

FIG. 12 is a flowchart illustrating another particular use case of the method of FIG. 10. In one embodiment, the steps of the method are performed by the publishing platform 305. Other embodiments perform the illustrated steps in different orders, and/or perform different or additional steps. Moreover, some of the steps may be performed by systems other than the publishing platform 305.

The publishing platform 305 identifies 1202 a glossary associated with a foundation document and extracts 1104 primary terms from the glossary. The foundation document is sent 1206 for presentation to users. For example, the foundation document may be configured for rendering by eReading browser applications 170 executing on client devices 310 of the users, and one or more pages of the document are sent 1206 to a device 310 for rendering. As the users read and interact with the foundation document, they may search for terms appearing in the document. The eReading browser applications 170 send the user's searches to the publishing platform 305 for processing. The publishing platform 305 receives 1208 the terms searched by the users and aggregates 1210 the searches within each foundation document. In one embodiment, the platform 305 aggregates 1210 the searches by filtering the searches according to the foundation document associated with each search.

The aggregated terms are analyzed 1212 to determine root words of the searched terms. In one embodiment, the publishing platform 305 analyzes 1212 the aggregated terms by determining whether the terms appear in the foundation document. The platform 305 leverages the data generated by the text coalescence module 215, including the words of the foundation document and the location of each of the words within the document, to determine whether the searched terms match words in the document being searched. If a direct match is not found, the platform 305 may search for similar words based on a determination that the user is likely to search for terms in the foundation document. For example, if a user searches the "Biology 101" textbook for the term "mitocondria," the platform 305 may identify "mitochondria" as a term appearing in the textbook that closely matches the searched term. The platform 305 may initially bound a search for similar terms to the section of the foundation document the user is currently reading before broadening the search to include the words of the entire document.

After determining the searched terms that correspond to words appearing in the foundation document being searched, the publishing platform 305 continues the analysis 1212 to determine root words. For example, users search the "Biology 101" textbook for the terms "mitochondria" and "mitochondrial," as well as the phrase "How does mitochondrial inheritance work?" The publishing platform 305 analyzes 1212 the searched terms and phrases to determine that "mitochondria," for example, is a root word common to the example searches.

The publishing platform 305 quantifies 1214 the number of searches for the determined root words, calculating the number of times users have searched for a root word or derivatives of a root word in a foundation document.

Based on the aggregation 1210, analysis 1212, and quantification 1214 of the searched terms, the publishing platform 305 identifies 1216 secondary terms of the document. In one embodiment, each secondary term is a term appearing in the foundation document that has been searched by a plurality of users. Furthermore, based on the reconstruction of the document, the publishing platform 305 may associate each secondary term with metadata indicating the location of the term in the foundation document. The publishing platform 305 stores 1218 the secondary terms and their locations in association with the primary terms.

By providing users with a dynamic listing of terms and their definitions, the terms listing production system 320 supports a user's comprehension of a foundation document. For example, while reading a given page of a textbook, the user can access definitions for terms appearing on the page without leaving the current page. Additional content, such as synonyms of a term or a translation of the term into a different language, can also be readily provided to the user to augment the term's static definition and enhance the user's understanding of the term. Moreover, the possibility to filter the terms listing provides users with terms that are more relevant than a static set of terms associated with a document. For example, if students registered to the same course are studying a textbook in preparation for an exam, the students may search for particular terms in the textbook that are relevant to the expected content of the exam. A student may apply a filter to determine the terms searched by his classmates as they are preparing for the exam, and thus limit the presented terms to those that are most relevant to his present studying.

Additional Configuration Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML or HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for generating a terms listing associated with an educational electronic document having a plurality of pages, the method comprising:
reconstructing the educational electronic document to identify locations of content in the electronic document;
identifying, based on the reconstruction, a glossary associated with the electronic document, the glossary including a listing of plurality of primary terms of the electronic document;
extracting a plurality of the primary terms from the glossary, each extracted primary term associated with a location in the electronic document based on the reconstruction;
sending one or more pages of the electronic document for presentation to a plurality of users, the pages of the electronic document configured for rendering by client devices of the users;
receiving, from the client devices, terms searched by the users in relation to the electronic document;
processing the received terms to determine a plurality of secondary terms, each secondary term associated with a location in the electronic document based on the reconstruction, wherein each secondary term is a searched term received from a plurality of the client devices; and
storing the secondary terms and the locations of each secondary term in the electronic document in association with the extracted primary terms.

2. The method of claim 1, further comprising:
identifying a term of the plurality of primary and secondary terms occurring in a related content document;
extracting content associated with the identified term from the related content document, the extracted content comprising a secondary definition of the identified term; and
storing the secondary definition in connection with the identified term.

3. The method of claim 2, wherein the related content document is an electronic dictionary, and wherein extracting content associated with the identified term comprises:
extracting a definition associated with the identified term from the electronic dictionary; and
storing the extracted definition in connection with the identified term.

4. The method of claim 2, wherein the educational electronic document is in a first language, wherein the related content document is a dictionary in a second language, and wherein the method further comprises:
translating the identified term into the second language; and
identifying a definition associated with the translated term in the second language dictionary;
wherein extracting the content associated with the identified term comprises extracting the definition associated with the translated term.

5. The method of claim 4, further comprising:
extracting from the second language dictionary, an audio file including a pronunciation of the identified term in the second language.

6. The method of claim 2, wherein the related content document is a thesaurus including synonyms of the identified term, and wherein extracting the content associated with the identified term comprises:
extracting the synonyms from the thesaurus; and
storing the extracted synonyms in connection with the identified term.

7. The method of claim 1, further comprising:
filtering the secondary terms based on the location of each secondary term in the electronic document; and
sending the filtered secondary terms for rendering by a client device of a user.

8. The method of claim 1, wherein receiving the terms searched by the users in relation to the electronic document comprises determining a time stamp at which each search was received, and wherein the method further comprises:
- filtering the secondary terms based on a time stamp of at least one search corresponding to each secondary term; and
- sending the filtered secondary terms for rendering by a client device of a user.

9. The method of claim 1, wherein a user is connected to a plurality of other users in a social graph, and wherein the method further comprises:
- filtering the secondary terms based on the connections in the social graph; and
- sending the filtered secondary terms for rendering by a client device of the user.

10. The method of claim 1, wherein processing the received terms comprises:
- analyzing the received terms to determine root words of the received terms;
- determining a number of searches for each determined root word; and
- identifying a root word as a secondary term if the root word is associated with a plurality of the received terms.

11. The method of claim 1, further comprising:
- sending a markup language region for rendering by a client device of a user, the markup language region displaying a primary term or a secondary term;
- receiving a user input at the markup language region; and
- sending the a page of the electronic document corresponding to the location of the primary or secondary term in the electronic document for rendering by the client device.

12. A non-transitory computer-readable medium storing executable computer program instructions for generating a terms listing associated with an educational electronic document having a plurality of pages, the computer program instructions comprising instructions for:
- reconstructing the educational electronic document to identify locations of content in the electronic document;
- identifying, based on the reconstruction, a glossary associated with the electronic document, the glossary including a listing of plurality of primary terms of the electronic document;
- extracting a plurality of the primary terms from the glossary, each extracted primary term associated with a location in the electronic document based on the reconstruction;
- sending one or more pages of the electronic document for presentation to a plurality of users, the pages of the electronic document configured for rendering by client devices of the users;
- receiving, from the client devices, terms searched by the users in relation to the electronic document;
- processing the received terms to determine a plurality of secondary terms, each secondary term associated with a location in the electronic document based on the reconstruction, wherein each secondary term is a searched term received from a plurality of the client devices; and
- storing the secondary terms and the locations of each secondary term in the electronic document in association with the extracted primary terms.

13. The non-transitory computer-readable medium of claim 12, the computer program instructions further comprising instructions for:
- identifying a term of the plurality of primary and secondary terms occurring in a related content document;
- extracting content associated with the identified term from the related content document, the extracted content comprising a secondary definition of the identified term; and
- storing the secondary definition in connection with the identified term.

14. The non-transitory computer-readable medium of claim 13, wherein the related content document is an electronic dictionary, and wherein extracting content associated with the identified term comprises:
- extracting a definition associated with the identified term from the electronic dictionary; and
- storing the extracted definition in connection with the identified term.

15. The non-transitory computer-readable medium of claim 13, wherein the educational electronic document is in a first language, wherein the related content document is a dictionary in a second language, and wherein the computer program instructions further comprise instructions for:
- translating the identified term into the second language; and
- identifying a definition associated with the translated term in the second language dictionary;
- wherein extracting the content associated with the identified term comprises extracting the definition associated with the translated term.

16. The non-transitory computer-readable medium of claim 15, the computer program instructions further comprising instructions for:
- extracting from the second language dictionary, an audio file including a pronunciation of the identified term in the second language.

17. The non-transitory computer-readable medium of claim 13, wherein the related content document is a thesaurus including synonyms of the identified term, and wherein extracting the content associated with the identified term comprises:
- extracting the synonyms from the thesaurus; and
- storing the extracted synonyms in connection with the identified term.

18. The non-transitory computer-readable medium of claim 12, the computer program instructions further comprising instructions for:
- filtering the secondary terms based on the location of each secondary term in the electronic document; and
- sending the filtered secondary terms for rendering by a client device of a user.

19. The non-transitory computer-readable medium of claim 12, wherein receiving the terms searched by the users in relation to the electronic document comprises determining a time stamp at which each search was received, and wherein the computer program instructions further comprise instructions for:
- filtering the secondary terms based on a time stamp of at least one search corresponding to each secondary term; and
- sending the filtered secondary terms for rendering by a client device of a user.

20. The non-transitory computer-readable medium of claim 12, wherein a user is connected to a plurality of other users in a social graph, and wherein the computer program instructions further comprise instructions for:
- filtering the secondary terms based on the connections in the social graph; and
- sending the filtered secondary terms for rendering by a client device of the user.

21. The non-transitory computer-readable medium of claim 12, wherein processing the received terms comprises:
    analyzing the received terms to determine root words of the received terms;
    determining a number of searches for each determined root word; and
    identifying a root word as a secondary term if the root word is associated with a plurality of the received terms.

22. The non-transitory computer-readable medium of claim 12, wherein the computer program instructions further comprise instructions for:
    sending a markup language region for rendering by a client device of a user, the markup language region displaying a primary term or a secondary term;
    receiving a user input at the markup language region; and
    sending the a page of the electronic document corresponding to the location of the primary or secondary term in the electronic document for rendering by the client device.

* * * * *